(12) United States Patent
Kirubanandan et al.

(10) Patent No.: US 8,856,540 B1
(45) Date of Patent: Oct. 7, 2014

(54) CUSTOMIZED ID GENERATION

(75) Inventors: Nandakiran Kirubanandan, Seattle, WA (US); Morgan K. Akers, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 878 days.

(21) Appl. No.: 12/980,930

(22) Filed: Dec. 29, 2010

(51) Int. Cl.
*G06F 21/00* (2013.01)
*G06F 21/30* (2013.01)

(52) U.S. Cl.
CPC ..................... *G06F 21/30* (2013.01)
USPC .......................................... 713/182

(58) Field of Classification Search
USPC .......................................... 713/182
See application file for complete search history.

(56) References Cited

U.S. PATENT DOCUMENTS

| | | | |
|---|---|---|---|
| 5,757,923 A * | 5/1998 | Koopman, Jr. | 380/46 |
| 5,790,785 A * | 8/1998 | Klug et al. | 726/11 |
| 5,913,217 A * | 6/1999 | Alger et al. | 713/502 |
| 6,292,904 B1 * | 9/2001 | Broomhall et al. | 714/1 |
| 6,654,748 B1 * | 11/2003 | Rabung et al. | 709/203 |
| 6,854,016 B1 * | 2/2005 | Kraenzel et al. | 709/229 |
| 7,188,138 B1 * | 3/2007 | Schneider | 709/203 |
| 7,392,243 B2 * | 6/2008 | Brown et al. | 1/1 |
| 7,409,540 B2 * | 8/2008 | Ingerman et al. | 713/150 |
| 7,591,012 B2 * | 9/2009 | Jaganathan et al. | 726/14 |
| 7,743,412 B1 * | 6/2010 | Mi et al. | 726/20 |
| 7,930,370 B2 * | 4/2011 | Risbud | 709/220 |
| 7,970,943 B2 * | 6/2011 | Lin et al. | 709/246 |
| 8,015,266 B1 * | 9/2011 | Lee et al. | 709/220 |
| 8,078,761 B2 * | 12/2011 | Cardina et al. | 709/246 |
| 2004/0064693 A1 * | 4/2004 | Pabla et al. | 713/168 |
| 2004/0162786 A1 * | 8/2004 | Cross et al. | 705/59 |
| 2005/0014494 A1 * | 1/2005 | Owen et al. | 455/419 |
| 2005/0188219 A1 * | 8/2005 | Annic et al. | 713/200 |
| 2006/0004789 A1 * | 1/2006 | Lunt et al. | 707/100 |
| 2006/0141981 A1 * | 6/2006 | Lin | 455/403 |
| 2006/0218178 A1 * | 9/2006 | Cannon et al. | 707/102 |
| 2007/0106673 A1 * | 5/2007 | Enenkiel | 707/10 |
| 2007/0223694 A1 * | 9/2007 | Krzemienski | 380/229 |
| 2008/0010366 A1 * | 1/2008 | Duggan | 709/223 |
| 2008/0162941 A1 * | 7/2008 | Tomita | 713/182 |
| 2008/0177772 A1 * | 7/2008 | Karamchedu et al. | 707/102 |
| 2009/0133110 A1 * | 5/2009 | Kumar et al. | 726/8 |
| 2009/0276419 A1 * | 11/2009 | Jones et al. | 707/5 |
| 2009/0276848 A1 * | 11/2009 | Suzuki et al. | 726/17 |
| 2010/0024005 A1 * | 1/2010 | Huang et al. | 726/3 |
| 2010/0088752 A1 * | 4/2010 | Nagulakonda et al. | 726/6 |
| 2010/0229241 A1 * | 9/2010 | Liu et al. | 726/26 |
| 2011/0093709 A1 * | 4/2011 | Lunt et al. | 713/168 |

(Continued)

*Primary Examiner* — Christopher Revak
*Assistant Examiner* — Jason C Chiang
(74) *Attorney, Agent, or Firm* — Hope Baldauff, LLC (57) ABSTRACT

Technologies are described herein for customized identifier ("ID") generation by an ID service. One or more calling components ("components") remote from the ID service generate requests for IDs. The requests can include one or more rules defining how the IDs are to be generated, type data identifying a type of IDs to be generated, encryption data specifying whether, and if so, how the IDs are to be encrypted, and number data defining how many IDs are to be generated at a particular time. The ID service receives the request, and in response to the request, generates the number of IDs specified, in accordance with the rules, type data, and encryption data provided in the request. An ID database can store one or more of the IDs and/or rules associated with the components, such that each component can be relieved from maintaining its own database for ID operations.

24 Claims, 5 Drawing Sheets

(56) References Cited

U.S. PATENT DOCUMENTS

| | | | |
|---|---|---|---|
| 2011/0191863 A1* | 8/2011 | O'Connor et al. | 726/29 |
| 2011/0320604 A1* | 12/2011 | Kulkarni et al. | 709/226 |
| 2012/0059824 A1* | 3/2012 | Simon | 707/737 |
| 2012/0259912 A1* | 10/2012 | Kruse et al. | 709/203 |
| 2013/0061036 A1* | 3/2013 | Oliver | 713/150 |
| 2013/0198831 A1* | 8/2013 | Jump et al. | 726/16 |

* cited by examiner

CUSTOMIZED ID GENERATION

BACKGROUND

Identifiers ("IDs") may be used in various types of systems, networks, and/or other devices ("systems") to identify entities and/or resources used, consumed, and/or provided by the systems. The use of IDs to identify entities can be a valuable tool for simplifying data operations. For example, systems can assign IDs of a consistent format, size, and/or type to various unrelated entities that otherwise may be described in varied formats, lengths, and/or types of labels, and/or may have identical or overlapping labels or other identifying information. Thus, systems can use IDs to simplify identification of resources and/or other entities.

Typically, systems that make use of IDs generate IDs using logic, and store the IDs and/or the logic for generating the IDs in a dedicated database. As IDs are needed, the system generates a new ID, typically incrementing a previously created or used ID. The IDs may be incremented by one or more digits or other alphanumeric characters, or otherwise may be generated based upon the logic associated with the system. According to various implementations, the logic associated with the systems may define how the IDs are created, for example, by basing a new ID upon an incremental change to a previously created or used ID, as well as other aspects of the IDs such as length of the IDs, format of the IDs, a type for the IDs, and/or other information defining the IDs.

In order for IDs to be useful to the system, the IDs typically are required to be unique with respect to one another and/or with respect to IDs generated by other systems with which the system interacts. Enforcing uniqueness across varied platforms and/or systems can be challenging, as varied platforms and/or systems may coincidentally select similar or identical ID generation schemes that allow or even unintentionally encourage ID collisions. As systems merge, communicate, interact, and/or rely upon one another, the need for unique IDs can become more pronounced.

Furthermore, as many traditional networking systems are migrated to virtually hosted networking systems and/or networks, various systems and/or their respective databases for ID generation may be hosted by the same or closely related virtual resources. Thus, one or more virtual machines may be tasked with hosting two or more systems and their respective two or more ID databases to support various operations including, but not limited to, ID generation and management. This redundancy can increase costs associated with virtual hosting services.

It is with respect to these and other considerations that the disclosure made herein is presented.

DETAILED DESCRIPTION

The following detailed description is directed to technologies for customized identifier ("ID") generation. According to various implementations, an ID includes, but is not limited to, strings, integers, and/or other data that can be used to identify one or more entities. For example, the IDs can include alphanumeric strings, globally unique identifiers ("GUIDs"), a combination of characters, encrypted and/or non-encrypted strings, integers, and the like, and/or other data. According to various embodiments, the entities identified by the IDs include, but are not limited to, merchant accounts, merchants, marketplaces, websites, services, virtual resources, products, items, customers, orders, domain names, and the like.

Utilizing the technologies described herein, an ID service is configured to receive requests for generating customized IDs from a number of calling components ("components"). According to implementations, the components are components of websites, client devices such as client computers, smartphones, server computers, and the like, and/or other components of other systems in communication with the ID service. The requests received by the ID service include one or more rules for generating the IDs. The one or more rules specify a format and/or method used by the ID service to generate the IDs for the components, as well as additional or alternative data.

According to various implementations, the requests further can include type data specifying a type of ID to be generated by the ID service. In some embodiments, the type data specifies a type corresponding to a globally unique identifier ("GUID") for the IDs. Thus, the ID service can generate a GUID for each requested ID, and provide the GUID to the component in response to the request. Other types of IDs can be specified by the type data. The requests also can include encryption data specifying if IDs generated by the ID service are to be encrypted by the ID service before providing the IDs to the components. The encryption data can include data indicating a value such as a 0, 1, true, false, yes, no, and/or another value, wherein the encryption data functions as an encryption flag that indicates whether or not a generated ID is to be encrypted. Additionally, or alternatively, the encryption data can specify an encryption method or algorithm used to encrypt the ID.

The requests further can include number data specifying a number of IDs to be generated by the ID service in response to the request. For example, the number data can specify a number of IDs to be generated such that the ID service responds to the request with a batch of IDs. In some embodiments, the batch of IDs can be provided to the component at one time, thereby reducing communication traffic between the component and the ID service for provisioning of the number of IDs. Additionally, or alternatively, the number data can specify a number of IDs generated simultaneously, wherein the number of IDs are backward- and/or forward-compatible with one another. For example, the ID service may generate two or more IDs for a particular request, wherein the two or more IDs correspond to two or more versions of a single ID that may be associated with a particular entity. In one embodiment, the ID service generates a 32-bit version of an ID and a 64-bit version of the ID, provides one or more of the versions of the ID to a component, and stores one or more versions of the ID for future reference and/or use. It should be understood that this embodiment is exemplary, and should not be construed as being limiting in any way.

The IDs generated by the ID service can be provided, one or more at a time, to a component associated with the request. According to various embodiments, the IDs are provided to the component that generated the request, but this is not necessarily the case. The IDs can be provided one at a time or in batches of IDs. The component can cache or store the one or more IDs and/or assign or associate the IDs with one or more entities as the IDs are needed. Alternatively, the component can generate a request for an ID each time an ID is needed, for example, each time a new product is added to a marketplace, each time an order is created, and the like.

According to some implementations, the ID service is configured to generate IDs for any number of components. The components can submit rules to the ID service, and the ID service can store the rules at a data storage device for use in generating IDs for the component. In some embodiments, the components authenticate with the ID service before, during, or after submitting a request to the ID service for generating an ID. Thus, the ID service can ensure that users of the ID service are authorized to generate IDs using the ID service, and/or the ID service can retrieve rules associated with the component requesting generation of an ID if the rules are not submitted with the request. These and other aspects of the concepts and technologies disclosed herein will be described in more detail below with reference to the figures.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not necessarily drawn to scale. Like numerals represent like elements throughout the several figures.

Figure 1:
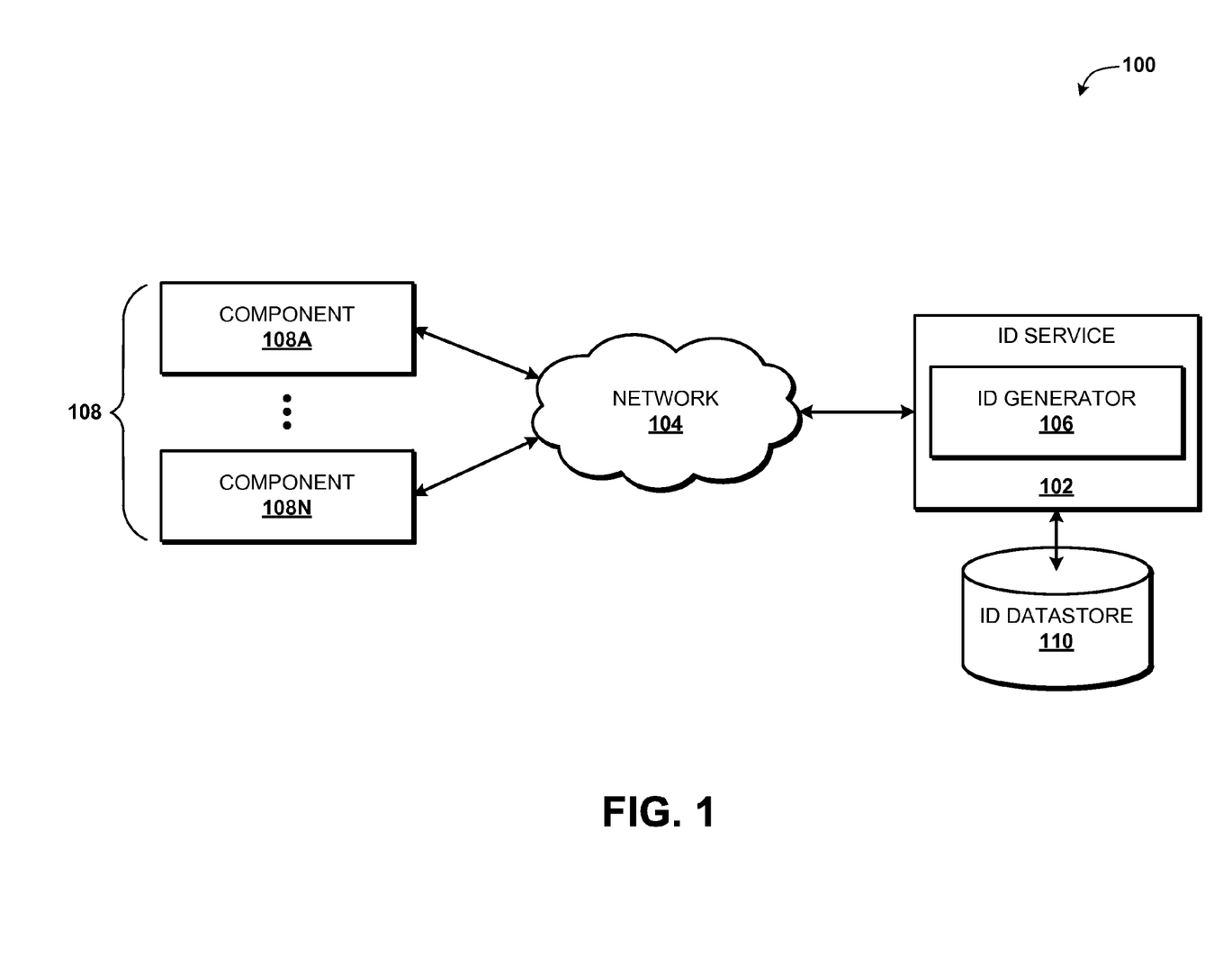
FIG. 1 is a system diagram showing aspects of one illustrative operating environment for the embodiments disclosed herein for customized ID generation, according to an exemplary embodiment.

FIG. 1 and the following description are intended to provide a brief, general description of a suitable computing environment in which the embodiments described herein may be implemented. In particular, FIG. 1 is a system and network diagram that shows aspects of an illustrative operating environment 100 that includes a customized ID generation service ("ID service") 102 operating on or in communication with a network 104. According to various implementations, the functionality of the ID service 102 is provided by any number of computing resources operating on or in communication with the network 104. As such, the network 104 can provide a cloud computing environment, and the ID service 102 can be provided as a service operating in the cloud computing environment. Thus, while the ID service 102 and the network 104 are illustrated and described as distinct entities, it should be understood that various functionality associated with the network 104 and the ID service 102 may be provided by the same and/or similar hardware, software, and/or other real or virtual computing resources.

More particularly, the functionality associated with the ID service 102 is provided, in some embodiments, by computing resources of the network 104. The computing resources of the network 104 include, but are not limited to, data processing resources, data storage resources, communication resources, and the like. Each type of computing resource may be general-purpose or may be available in a number of specific configurations. For example, data processing resources may be available as virtual machine instances ("instances") configured to provide World Wide Web ("Web") servers, application servers, media servers, database servers, and the like. Data storage resources may include file storage devices, block storage devices, and the like. Each type or configuration of computing resource may be available in different sizes, such as large resources, consisting of many processors, large amounts of memory, and/or large storage capacity, and small resources consisting of fewer processors, smaller amounts of memory, and/or smaller storage capacity. These and other aspects of the network 104 and/or the ID service 102 can be tailored by network operators, service operators, and/or other entities, based upon various needs and/or preferences.

In other embodiments, the functionality of the ID service 102 is provided by a computer server or other computing device configured to execute an application program or module for providing the functionality described herein for customized ID generation. In the illustrated embodiment shown in FIG. 1, the functionality of the ID service 102 is provided by a server computer configured to execute an ID generator module or application ("ID generator") 106. It should be understood that this embodiment is exemplary, and should not be construed as being limiting in any way. Because the functionality of the ID service 102 can be provided by various combinations of hardware, software, and/or other real or virtual resources, it should be understood that the functionality described herein with regard to the ID service 102 and/or the ID generator 106 can be provided by one or more hardware and/or software components.

The ID service 102 is configured to receive requests for IDs from one or more calling components ("components") 108A-N (hereinafter referred to generically as "components 108") in communication with the ID service 102. According to various embodiments, the components 108 include, but are not limited to, systems, devices, network nodes, software modules, applications, services, websites, and/or components of these and other entities. In one embodiment, the components 108 correspond to website components that use IDs to identify one or more entities. It should be understood that this embodiment is exemplary, and should not be construed as being limiting in any way.

As will be described in more detail herein, the components 108 are configured to generate the requests for IDs, and to submit the requests to the ID service 102 for generation of customized IDs in accordance with one or more rules and/or other parameters submitted with the requests by the components 108. According to various implementations, the ID service 102 can store generated IDs, information associating IDs with one another and/or components 108, and/or other data at a data storage device accessible by the ID service 102. According to embodiments, the functionality of the data storage device accessibly by the ID service 102 is provided by one or more databases, servers, memory devices, mass storage devices, and/or other stand-alone, networked, and/or cloud-based memory storage devices. In the illustrated embodiment, the data storage device is illustrated as an ID datastore 110. It should be understood that this embodiment is exemplary, and should not be construed as being limiting in any way.

In some embodiments, the ID service 102 stores one or more generated IDs in the ID datastore 110 in addition to, or instead of, providing the IDs to the components 108. In one embodiment, two or more versions of an ID are generated by the ID service 102, and the two or more versions of the ID are stored at the ID datastore 110. One or more versions of the ID also can be provided to the component 108 for use. The component 108 can retrieve additional versions of the ID based upon a lookup in the ID datastore 110 referencing the version of the ID used by the component 108.

The ID datastore 110 also can be used to store rules for generating the IDs. The rules can be associated with a component 108, and can be retrieved and used to generate IDs when requested by the component 108 instead of, or in addition to, receiving rules from the component 108 with the request for the IDs. According to various implementations, the components 108 authenticate with the ID service 102 before, during, or after submitting requests for IDs to the ID service 102. Via authentication, the ID service 102 is configured to establish authority for generating the IDs and/or to identify the component 108 requesting IDs such that rules associated with the component 108 can be retrieved. Thus, the components 108 can submit rules for generating IDs with each request for an ID, or the rules associated with the components 108 can be stored and associated with the components 108 such that the rules do not need to be submitted by the components 108 each time an ID is requested.

Figure 2:
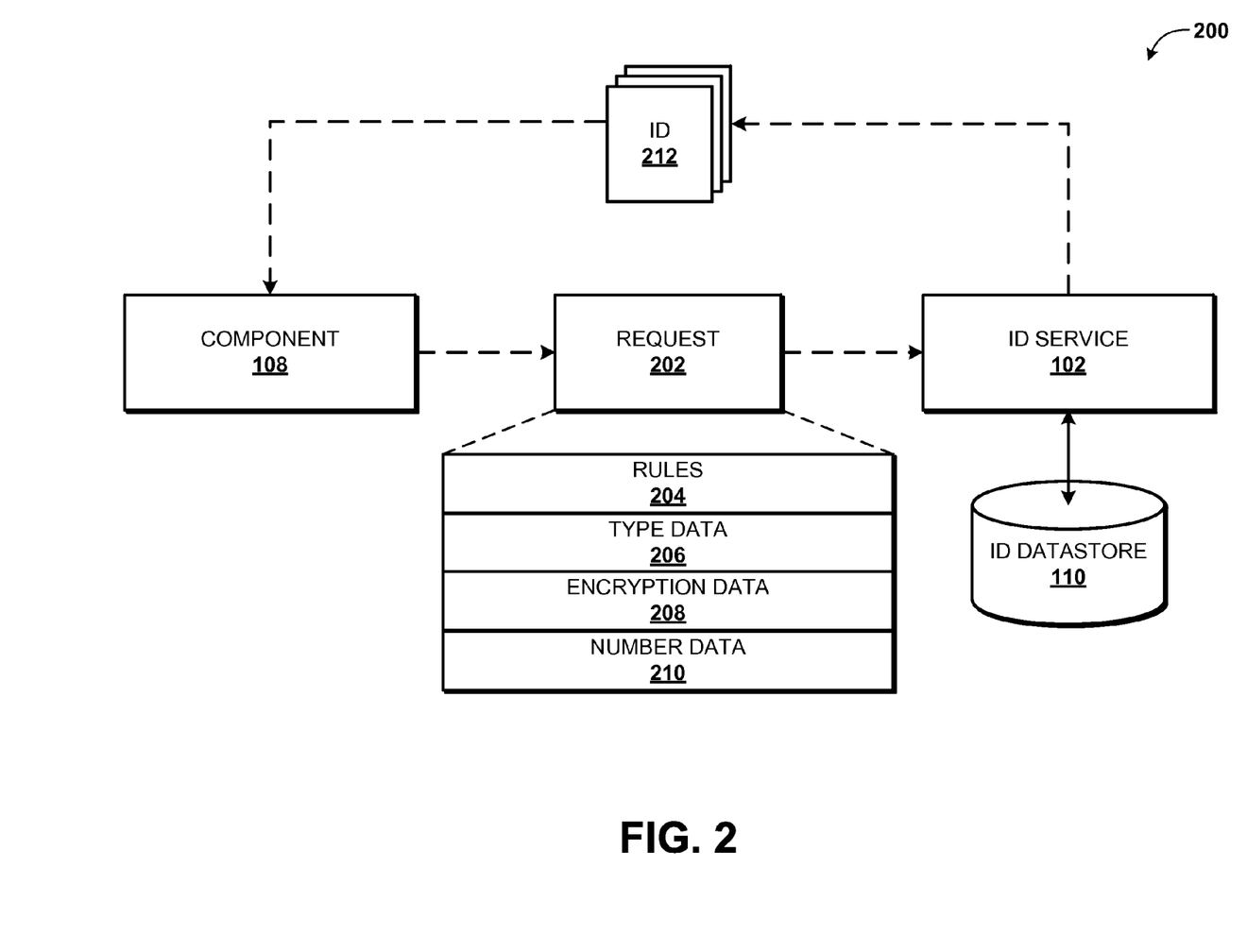
FIG. 2 is a system diagram showing aspects of a system that implements the concepts and technologies disclosed herein for customized ID generation, according to an exemplary embodiment.

Turning now to FIG. 2 additional aspects of a system 200 for generating customized IDs are described in detail. As shown in FIG. 2, a component 108 transmits a request 202 for a customized ID to the ID service 102. The component 108 is configured to generate and format the request 202. According to implementations, the request 202 is formatted by the component 108 in a format, language, or protocol interpretable by the ID service 102. In some embodiments, the request 202 is generated as an extensible markup language ("XML") file that includes various parameters detailing the type, number, and/or other aspects of the customized ID(s) requested by the component 108. It should be understood that this embodiment is exemplary, and should not be construed as being limiting in any way. While only one component 108 is illustrated in FIG. 2, it should be clear from the description herein that the ID service 102 is configured to receive requests 202 from a number of components 108, and that the ID service 102 can generate IDs customized to each of the components 108 in accordance with the rules and/or other parameters generated by the components 108 and submitted to the ID service 102 with the requests 202 and/or stored by the ID service 102.

According to one embodiment, the parameters and/or other data included in the request 202 include, but are not limited to, one or more rules 204 defining how the ID service 102 is to generate IDs, type data 206 indicating a type of ID to be generated by the ID service 102, encryption data 208 specifying if IDs generated in response to the request 202 are to be encrypted, and number data 210 specifying a number of IDs to be generated by the ID service 102 in response to the request 202. According to various embodiments, additional or alternative information may be included in the request 202.

The rules 204 define how the IDs are generated for the component 108 calling the ID service 102. For example, the rules 204 can specify a scheme used to generate IDs, such as a rule for incrementing a last-generated ID or other base data, a rule for basing ID generation upon session or time information and the like, and/or other rules. The rules 204 also can specify, for example, a number of characters, whether, and if so, how to increment the IDs for subsequent ID requests, and/or other aspects of how the IDs are to be formatted and/or generated.

The rules 204 also can specify a degree to which the IDs generated by the ID service 102 are to be unique. For example, in some embodiments the rules 204 specify that the IDs generated by the ID service are to be unique globally, such that no other entity can generate an ID identical to an ID generated in accordance with the rules 204. In other embodiments, the rules 204 specify a scope for which the IDs generated by the ID service 102 are to be unique. In various implementations, the scope specified by the rules 204 includes a geographic region, a state, a country, a domain name, a generic top-level domain name ("gTLD") such as .com, .co.il, .biz, .co.uk, and the like, a website, a service, a network, a virtual resource, a virtual network, and the like. The rules 204 can be tailored by the component 108 and/or any authorized entity associated with the component 108.

In some embodiments, the ID service 102 is configured to store the rules 204 in the ID datastore 110, and to associate the rules 204 with the component 108 submitting the rules 204. Thus, the ID datastore 110 can be used to store rules 204 associated with a number of components 108, and the request 202 can include a reference identifying the rules 204 instead of, or in addition to, including the rules 204 themselves. As such, the component 108, or an authorized entity associated therewith, can tailor the rules 204 and request IDs without submitting the rules 204 with each request.

The type data 206 includes data specifying a type for the ID requested by the component 108. The type data 206 can be used to specify a type for the IDs such as, for example, a type corresponding to a 32-bit format, a type corresponding to a 64-bit format, a type corresponding to a 128-bit format, and/or other types. In some embodiments, the type data 206 specifies a GUID type. Thus, the request 202 may be interpreted by the ID service 102 to generate a GUID for each requested ID. In some embodiments, the type data 206 can be embodied by the rules 204. It therefore should be understood that in some embodiments, the rules 204 and/or the type data 206 can include an indication that the ID service 102 is to generate GUIDs for each requested ID. In these embodiments, one or more of the rules 204 and/or the type data 206 can be omitted from the request 202. It should be understood that this embodiment is exemplary, and should not be construed as being limiting in any way.

The encryption data 208 includes data specifying if IDs generated by the ID service 102 are to be encrypted and/or data defining how the IDs are to be encrypted. In some embodiments, IDs generated by the ID service 102 are encrypted before providing the generated IDs to the component 108. The encryption data 208 includes, in some implementations, a value such as 0, 1, true, false, yes, no, or another value. As such, the encryption data 208 can be interpreted by the ID service 102 as an encryption flag that indicates whether or not the IDs are to be encrypted. Additionally, or alternatively, the encryption data 208 can include or indicate an encryption algorithm or method used to encrypt the IDs. Thus, the encryption data 208 can include a hash key or algorithm or other data used by the ID service 102 to encrypt the IDs in addition to, or instead of, a flag indicating whether or not IDs are to be encrypted.

The number data 210 includes data specifying a number of IDs to be generated by the ID service 102 in response to the request 202. In some embodiments, the number data 210 is used to specify a size of a batch of IDs generated by the ID service 102. Thus, the component 108 can request, for example, a batch of IDs of almost any size. The batch of IDs can be provided to the component 108, and the component 108 can store or cache the IDs at a data storage device. As the IDs are needed by the component 108, the component 108 can retrieve the IDs from the stored or cached batch of IDs, and can assign the IDs to entities instead of generating individual requests 202 for each ID needed by the component 108.

In other embodiments, the number data 210 is used to specify a number of related IDs to be generated by the ID service 102. Thus, the component 108 can request a number of related IDs such that backward- and forward-compatible IDs are available for a particular entity for which the IDs are requested. For example, a component may administer IDs in a 32-bit format at a particular time, but may have plans or may anticipate migrating to a 64-bit format in the future. Thus, the number data 210 can be interpreted by the ID service 102 to generate two or more related IDs, wherein a first version of the ID is generated in a first format, and a second version of the ID is generated in a second format. In one embodiment, the first format corresponds to a 32-bit format, and the second format corresponds to a 64-bit format. It should be understood that this embodiment is exemplary, and should not be construed as being limiting in any way. Furthermore, it should be understood that more than two versions of the IDs can be generated by the ID service 102 in more than two formats.

In response to the request 202, the ID service 102 can generate the one or more IDs 212. In some embodiments, one or more of the IDs 212 are stored at the ID datastore 110 instead of, or in addition to, providing the IDs to the component 108. In some embodiments, for example, the ID service 102 generates two or more versions of an ID 212, provides one or more versions of the ID 212 to the component 108, and stores one or more versions of the ID 212 in the ID datastore 110 with data associating the various versions of the ID 212 with one another. The component 108 can later request another version of the ID 212 by submitting data identifying the version of the ID 212 received by and/or used by the component 108. The ID service 102 can perform a lookup in the ID datastore 110 for another version of the ID 212, and provide the other version of the ID 212 to the component 108. It should be understood that this embodiment is exemplary, and should not be construed as being limiting in any way.

Figure 3:
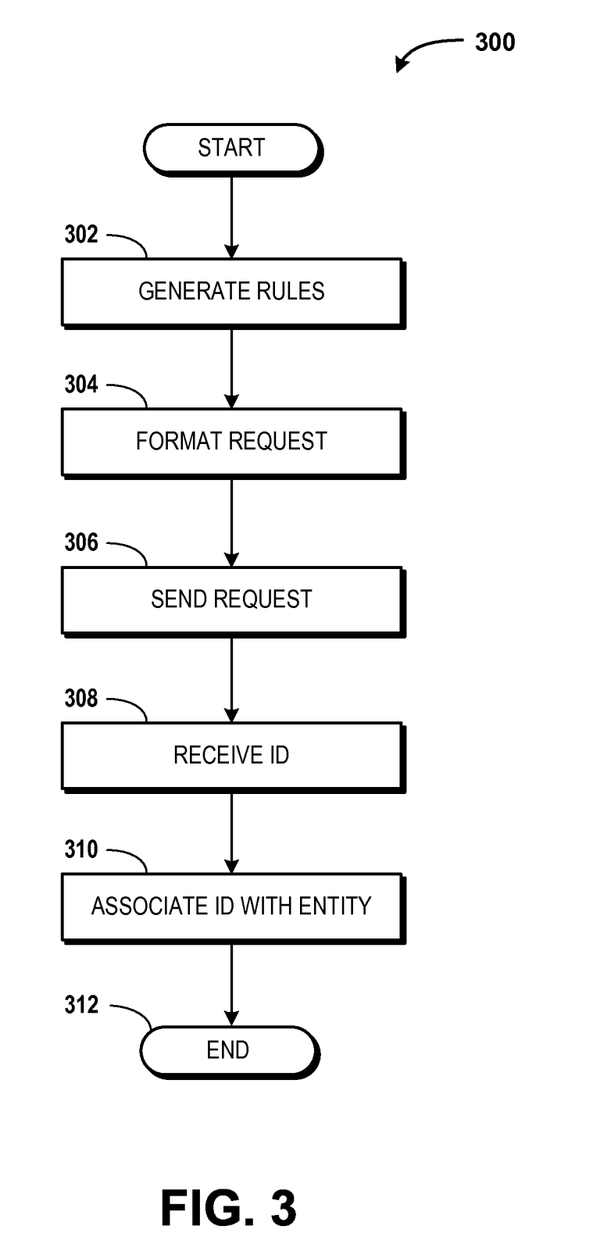
FIG. 3 is a flow diagram showing aspects of one method disclosed herein for generating requests for customized ID generation, according to an exemplary embodiment.

Turning now to FIG. 3, aspects of a method 300 for generating requests for customized IDs will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 is described as being performed by the component 108. It should be understood that this embodiment is exemplary, and should not be viewed as being limiting in any way. The method 300 begins at operation 302, wherein the component 108 generates the rules 204 to be submitted to the ID service 102 for use in generating IDs requested by the component 108. The rules 204 can include data defining how the IDs are to be generated and/or other information such as a base ID upon which the generated IDs are based, data identifying the last ID generated by the ID service 102, and/or other information that may be used by the ID service 102 to generate the one or more IDs 212, as explained above.

From operation 302, the method 300 proceeds to operation 304, wherein the component 108 formats a request 202 for submission to the ID service 102 for use in generating the one or more IDs 212. As explained above with reference to FIGS. 1-2, the request 202 can include the rules 204, as well as other data defining how the IDs 212 are to be generated by the ID service 102. According to various embodiments, the request 202 can include the rules 204, the type data 206, the encryption data 208, the number data 210, and/or other data. Operation 304 includes, in some implementations, formatting a file that includes these and/or other information for generating the IDs 212 for submission to the ID service 102 as the request 202. In one embodiment, the request 202 is formatted as an XML file that is interpretable by the ID service 102 to determine the rules 204, as well as a type information, encryption information, a number of IDs 212 to be generated, and/or other information associated with the request 202.

From operation 304, the method 300 proceeds to operation 306, wherein the component 108 sends the request 202 to the ID service 102. The request 202 can be transmitted to the ID service 102 via various networks and/or devices. In some embodiments, for example, the ID service 102 receives the request 202 via an application programming interface ("API") exposed by the ID service 102 to the component 108. Thus, the component 108 can call the ID service 102 via the API, and transmit the request 202 embodying the rules 204, the type data 206, the encryption data 208, the number data 210, and/or other information to the ID service 102. It should be understood that this embodiment is exemplary, and should not be construed as being limiting in any way.

From operation 306, the method 300 proceeds to operation 308, wherein the component 108 receives one or more IDs 212 from the ID service 102. A method for generating the IDs 212 is illustrated and described in detail below with reference to FIG. 4. As explained above with reference to FIGS. 1-2, the component 108 receives the number of IDs 212 of the type specified by the number data 210 and the type data 206, respectively, of the request 202, wherein the IDs are generated in accordance with the rules 204 of the request 202. Additionally, the IDs 212 received by the component 108 can be encrypted, if the encryption data 208 of the request 202 so specifies. These and other aspects of generating the IDs 212 will be described with reference to FIG. 4 below.

From operation 308, the method 300 proceeds to operation 310, wherein the component 108 associates one or more of the IDs 212 with one or more entities. According to various embodiments, the entities with which the IDs 212 are associated include, but are not limited to, merchants or merchant accounts, websites, services, virtual resources, products, customers, orders, items, networks, and/or other entities. As explained above, the IDs 212 can be received as a batch of IDs 212, and can be stored or cached by the component 108. Thus, although not illustrated in FIG. 3, it should be understood that the method 300 can include storing or caching one or more of the IDs 212 and retrieving one or more of the IDs 212 as the IDs 212 are needed for associating with one or more entities. From operation 310, the method 300 proceeds to operation 312. The method 300 ends at operation 312.

Figure 4:
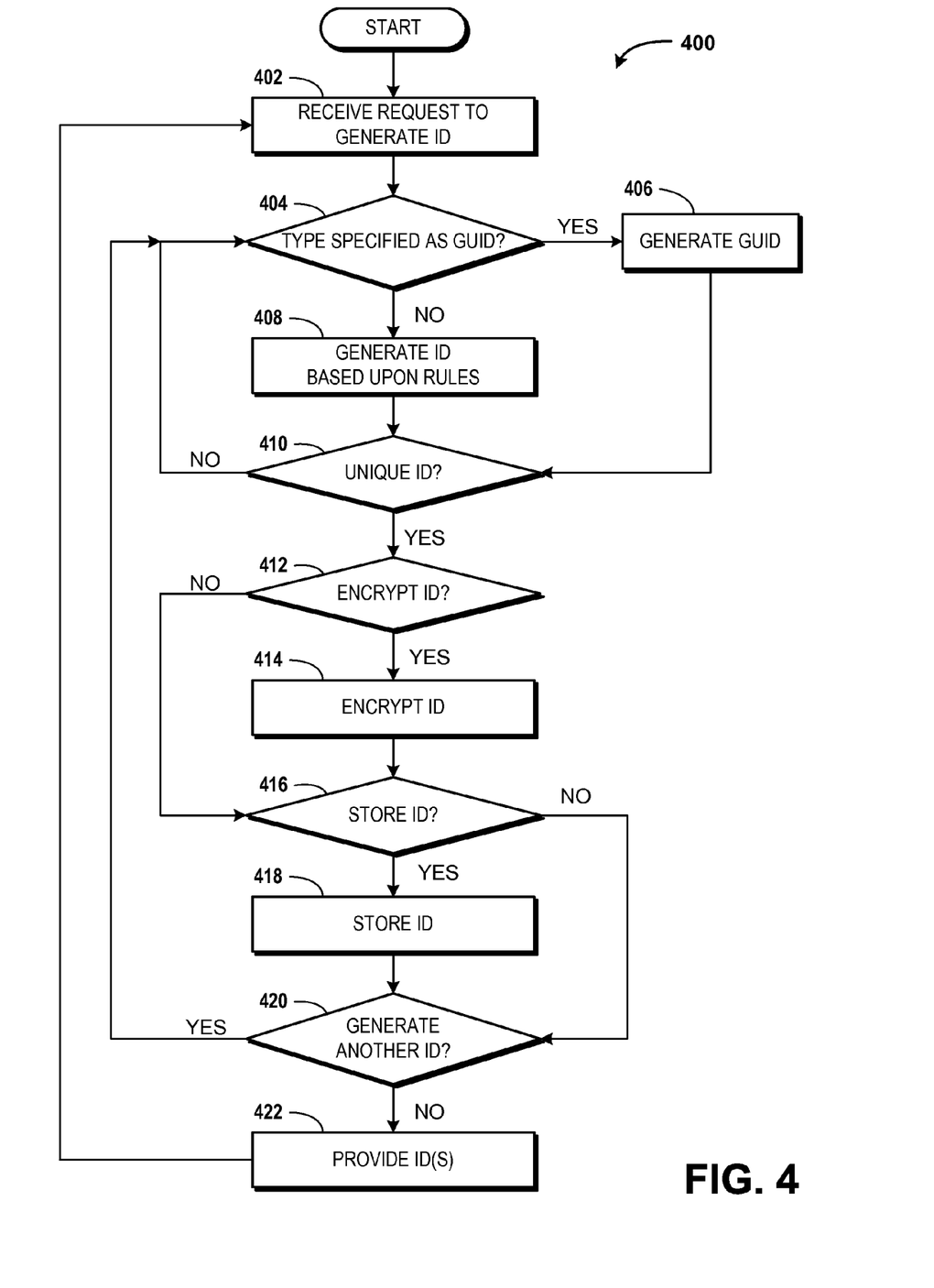
FIG. 4 is a flow diagram showing aspects of one method disclosed herein for customized ID generation, according to an exemplary embodiment.

Turning now to FIG. 4, aspects of a method 400 for generating one or more customized IDs 212 is illustrated in detail. For purposes of illustrating and describing the concepts of the present disclosure, the method 400 is described as being performed by the ID service 102. It should be understood that this embodiment is exemplary, and should not be viewed as being limiting in any way. The method 400 begins at operation 402, wherein the ID service 102 receives a request 202 to generate one or more IDs 212. As explained above with reference to FIGS. 1-3, the request 202 can include one or more rules 204, type data 206 specifying a type of ID 212 to be generated, encryption data 208 specifying whether the ID 212 is to be encrypted and/or how the ID 212 is to be encrypted, number data 210 specifying a number of IDs to be generated, and/or other information. Although not illustrated in FIG. 4, it should be understood that the ID service 102 can extract or parse these and other information from the request 202 to determine rules used to generate the IDs 212, a type and number of IDs 212 to be generated, whether and/or how the IDs 212 are to be encrypted, as well as other aspects of how the IDs 212 are to be generated.

From operation 402, the method 400 proceeds to operation 404, wherein the ID service 102 determines if the type of ID 212 specified in the request 202 corresponds to a type associated with a GUID. If the ID service 102 determines that the type specified in the request 202 corresponds to a type associated with a GUID, the method 400 proceeds to operation 406, wherein the ID service 102 generates a GUID as the ID 212. If the ID service 102 determines in operation 404 that the type specified by the request 202 does not correspond to a type associated with a GUID, the method 400 proceeds to operation 408, wherein the ID service 102 generates the ID 212 based upon the one or more rules 204 included in the request 202.

From operations 406 or 408, the method 400 proceeds to operation 410, wherein the ID service 102 determines if the ID 212 generated by the ID service 102 is unique. As explained above, in some embodiments the rules 204 received by the ID service 102 can specify a degree to which the IDs 212 are to be unique. In other embodiments, the ID service 102 enforces various levels of uniqueness based upon preferences, specifications, and/or global rules imposed by the ID service 102 and/or other entities. Thus, the operation 410 includes determining if the ID 212 generated by the ID service 102 satisfies a uniqueness requirement, regardless of whether that uniqueness requirement is specified on a global, national, statewide, website-wide, domain name-wide, service-wide, gTLD-wide, and/or other level.

If the ID service 102 determines in operation 410 that the ID 212 generated by the ID service 102 is not unique, the method 400 returns to operation 404, and the operations 404-408 can be repeated until the ID 212 generated in operations 404-408 satisfies the specified uniqueness requirement. It should be noted that GUIDs should, by design, be unique, though it is technically possible, although extremely improbable, that two identical generated GUIDs can be created. If the ID service 102 determines in operation 410 that the ID is unique, the method 400 proceeds to operation 412.

Although not illustrated in FIG. 4, in some embodiments, the ID service 102 is configured to take additional or alternative actions if the ID 212 is determined not to be unique in operation 410. For example, the ID service 102 can generate a notification or error message to inform the component 108 associated with the request 202 that the rules 204 have resulted in generation of an ID 212 determined not to be unique. The ID service 102 also can suggest methods for modifying the rules 204 and/or otherwise modifying the request 202 to encourage generation of unique IDs 212. The ID service 102 also can identify other components 108 for which generated IDs 212 can collide with the IDs 212 generated in operations 406 or 408, and inform the component 108. These and other actions are possible and are contemplated.

In some embodiments, the processes described above with regard to operation 410 can be omitted and/or replaced with other functionality for enforcing uniqueness on created IDs 212. For example, the ID service 102 can enforce uniqueness on all IDs 212 generated by the ID service 102 in addition to, or instead of, checking created IDs 212 to determine if the created IDs are unique. According to various implementations, the ID service 102 enforces uniqueness by ensuring that two identical IDs 212 are never generated. For example, the ID service 102 can lock a generated ID 212 for use after creation, thereby ensuring that identical IDs 212 cannot be created or stored in the ID datastore 110. In other embodiments, the rules 204 can be tailored to provide IDs 212 generated by incrementing alphanumeric characters such as numbers, such that two identical IDs 212 are never created by the ID service 102. In yet other embodiments, the ID service 102 can rely upon various formula blocks for generating various components of the IDs 212 separately to reduce or eliminate collisions between created IDs 212. In these and other embodiments, the IDs 212 generated by the ID service 102 can be unique when created, and therefore there may be no need to check the IDs 212 to ensure that the IDs 212 are unique. Thus, the functionality described above with respect to operation 410 for enforcing uniqueness on the created IDs 212 can be omitted, or replaced with functionality for enforcing uniqueness requirements on the IDs 212 during generation of the IDs 212 in addition to, or instead of, the functionality described above with reference to operation 410.

In operation 412, the ID service 102 determines if the ID 212 is to be encrypted and/or how the ID 212 is to be encrypted. As explained herein, the ID service 102 can examine the encryption data 208 of the request 202 and determine if the ID 212 is to be encrypted and/or a type of encryption to be applied to the ID 212. If the ID service 102 determines that the ID 212 is to be encrypted, the method 400 proceeds to operation 414, wherein the ID service 102 encrypts the ID 212 in accordance with an encryption scheme. The encryption scheme can be specified by the encryption data 208 of the request 202 and/or by preferences, settings, and/or other information associated with the ID service 102. In some embodiments, the ID service 102 encrypts the ID 212 by applying a hash algorithm to the ID 212. In one implementation, the hash algorithm applied by the ID service 102 is received as a part of the request 202, more particularly, as the encryption data 208. In another implementation, the ID service 102 stores one or more hash algorithms, and the ID service 102 associates the one or more hash algorithms with one or more of the components 108 and/or uses one or more of the hash algorithms based upon preferences or settings associated with the ID service 102. If the ID service 102 determines in operation 412 that the ID 212 is not to be encrypted, or from operation 414, the method 400 proceeds to operation 416.

In operation 416, the ID service 102 determines if the ID 202 is to be stored at a data storage device such as the ID datastore 110. As explained above, the ID service 102 can store one or more copies or versions of the IDs 212 at the ID datastore 110 and/or another data storage device for various purposes. If the ID service 102 determines in operation 416 that the ID 212 is to be stored, the method 400 proceeds to operation 418, wherein the ID service 102 stores the ID 212 or a copy of the ID 212. The ID 212 can be stored with association data, if desired, to allow lookups into the data stored at the ID datastore 110 or another data storage device to identify the ID 212. If the ID service 102 determines in operation 416 that the ID 212 is not to be stored, or from operation 418, the method 400 proceeds to operation 420.

In operation 420, the ID service 102 determines if another ID 212 is to be generated by the ID service 102. As explained herein, the ID service 102 can determine that a number of related IDs are to be generated and/or that a batch of IDs are to be generated. In some embodiments, the ID service 102 makes the determination illustrated at operation 420 by examining the number data 210 of the request 202, though this is not necessarily the case. If the ID service 102 determines, in operation 420, that another ID 212 is to be generated, the method 400 returns to operation 404. The operations 404-420 can be iterated any number of times by the ID service 102 until the desired number of IDs 212 are generated. If, in any iteration of operation 420, the ID service 102 determines that another ID is not to be generated, the method 400 proceeds to operation 422, wherein the ID service 102 provides the IDs to the component 108.

From operation 422, the method 400 returns to operation 402, wherein the ID service 102 waits for another request 202 from the same or another of the components 108. As explained above, it should be understood that the method 400 can end at any time. Also, although not illustrated in FIG. 4, it should be understood that the ID service 102 and/or another entity can authenticate the component 108 associated with the request 202 received in operation 402, if desired. As mentioned above, the authentication of the component 108 can occur before, during, or after the request 202 is received by the ID service 102. Successful authentication by the component 108 can be required before the ID service 102 executes the method 400, and/or can be used to retrieve the rules 204 associated with the component 108. Thus, it should be understood that an authentication operation can be provided before operation 402, after operation 402, and/or in conjunction with operation 402.

Figure 5:
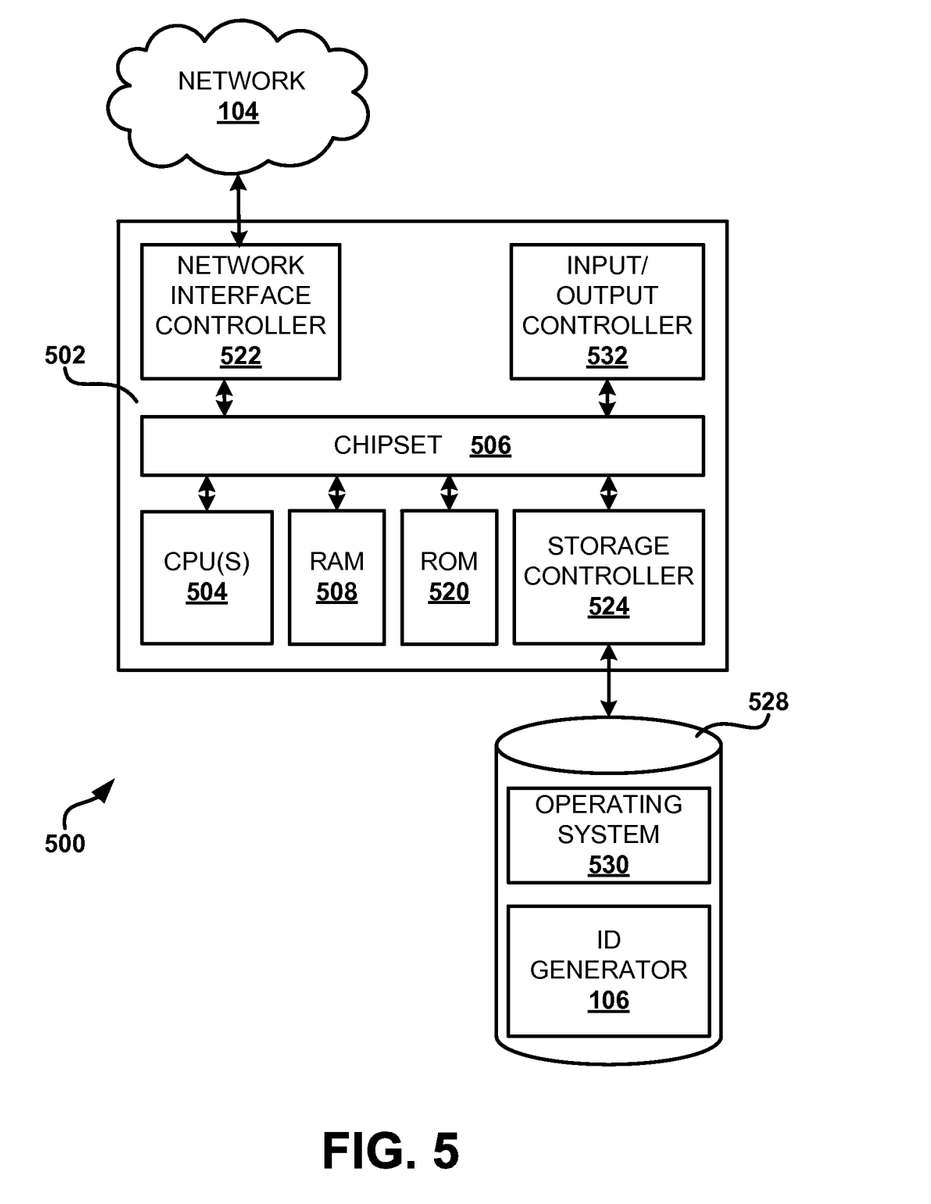
FIG. 5 is a computer architecture diagram showing an illustrative computer hardware architecture for implementing the various computing devices described in embodiments presented herein.

FIG. 5 shows an example computer architecture for a computer 500 capable of executing the software components described herein for customized ID generation. The computer architecture shown in FIG. 5 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the ID service 102 on a computing system including, but not limited to, the various computing devices mentioned herein.

The computer 500 includes a baseboard, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 are standard programmable processors that perform arithmetic and logical operations necessary for the operation of the computer 500.

The CPUs 504 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard. The chipset 506 may provide an interface to a random access memory ("RAM") 508, used as the main memory in the computer 500. The chipset 506 may further provide an interface to a computer-readable storage medium such as a read-only memory ("ROM") 520 or non-volatile RAM ("NVRAM") for storing basic routines that that help to startup the computer 500 and to transfer information between the various components and devices. The ROM 520 or NVRAM may also store other software components necessary for the operation of the computer 500 in accordance with the embodiments described herein.

The computer 500 may operate in a networked environment using logical connections to remote computing devices and computer systems through the network 104. The chipset 506 may include functionality for providing network connectivity through a network interface controller ("NIC") 522, such as a gigabit Ethernet adapter. The NIC 522 is capable of connecting the computer 500 to other computing devices over the network 104. It should be appreciated that multiple NICs 522 may be present in the computer 500, connecting the computer to other types of networks and remote computer systems.

The computer 500 may be connected to a mass storage device 528 that provides non-volatile storage for the computer. The mass storage device 528 may store system programs, application programs, other program modules, and data, which have been described in greater detail herein. The mass storage device 528 may be connected to the computer 500 through a storage controller 524 connected to the chipset 506. The mass storage device 528 may consist of one or more physical storage units. The storage controller 524 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 528 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 528 is characterized as primary or secondary storage, and the like.

For example, the computer 500 may store information to the mass storage device 528 by issuing instructions through the storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 528 by detecting the physical states or characteristics of one or more particular locations within the physical storage units.

In addition to the mass storage device 528 described above, the computer 500 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 528 may store an operating system 530 utilized to control the operation of the computer 500. According to one embodiment, the operating system includes a member of the LINUX family of operating systems. According to another embodiment, the operating system includes a member of the WINDOWS® SERVER family of operating systems from MICROSOFT Corporation in Redmond, Wash. According to further embodiments, the operating system may include a member of the UNIX or SOLARIS families of operating systems. It should be appreciated that other operating systems may also be utilized. The mass storage device 528 may store other system or application programs and data utilized by the computer 500 such as the ID generator 106.

In one embodiment, the mass storage device 528 or other computer-readable storage media is encoded with computer-executable instructions that, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform aspects of one or more of the methods 300 and 400 described with reference to FIGS. 3 and 4, respectively.

The computer 500 may also include an input/output controller 532 for receiving and processing input from a number of input devices, such as a keyboard, a mouse, a touchpad, a touch screen, an electronic stylus, or other type of input device. Similarly, the input/output controller 532 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for generating customized IDs have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

We claim:

1. A computer-implemented method for generating identifiers ("IDs"), the method comprising computer-implemented operations for:

receiving at an ID service a request to generate the IDs from one of a plurality of components, the request comprising type data identifying a type of the IDs, one or more rules specifying a scheme used to generate the IDs, encryption data specifying whether the IDs are to be encrypted, and number data specifying a number of IDs that are to be generated in response to the request;

in response to receiving the request, utilizing the one or more rules to generate the number of IDs of the type specified by the request by generating a first version of the IDs and a second version of the IDs;

associating the first version of the IDs with the second version of the IDs;

storing the second version of the IDs at a data storage device with data associating the second version of the IDs with the first version of the IDs;

determining that the encryption data specifies that the IDs are to be encrypted;

in response to determining that the encryption data specifies that the IDs are to be encrypted, encrypting the generated IDs;

providing the first version of the IDs to the one of the plurality of components requesting the IDs;

receiving a request to obtain the second version of the IDs from the one of the plurality of components, the request comprising data identifying the first version of the IDs;

identifying the second version of the IDs based, at least partially, upon the indication of the first version of the IDs; and providing the second version of the IDs to the one of the plurality of components.

2. The method of claim 1, further comprising:

determining that the type of the IDs comprises a type associated with a globally unique identifier ("GUID"); and in response to determining that the type comprises the type associated with the GUID, generating the IDs by generating a GUID for each of the IDs.

3. The method of claim 1, further comprising:

determining that individual ones of the IDs are unique; and in response to determining that one of the IDs is not unique, generating a further ID, and determining that the further ID is unique.

4. The method of claim 3, wherein determining that individual ones of the IDs are unique comprises determining that individual ones of the IDs are unique within a specified region.

5. The method of claim 3, wherein determining that individual ones of the IDs are unique comprises determining that individual ones of the IDs are globally unique.

6. The method of claim 1, wherein the request comprises an extensible markup language ("XML") file comprising the one or more rules, and wherein the one or more rules further indicate a format for the IDs.

7. The method of claim 1, wherein encrypting the IDs comprises generating a hash of each of the IDs by applying a hash algorithm to each of the IDs.

8. The method of claim 7, wherein the encryption data of the request comprises the hash algorithm.

9. The method of claim 1, wherein the one of the plurality of components comprises one of a plurality of website components.

10. The method of claim 1, further comprising authenticating the one of the plurality of components to determine that the one of the plurality of components is authorized to request the IDs.

11. A non-transitory computer storage medium having computer executable instructions stored thereon that, when executed by a computer, cause the computer to:

in response to receiving at an ID service a request to generate an ID, the request being generated by one of a plurality of components and comprising one or more rules specifying a scheme used to generate the ID, type data indicating a type of the ID, encryption data specifying whether the ID is to be encrypted, and number data specifying that a number of IDs are to be generated, utilize the rules to generate the number of IDs specified by the number data by generating at least a first version and a second version of the ID of the type specified by the request;

associate the first version of the ID with the second version of the ID;

store the second version of the ID at a data storage device with data associating the second version of the ID with the first version of the ID;

determine that the encryption data specifies that the ID is to be encrypted;

in response to determining that the encryption data specifies that the ID is to be encrypted, encrypt the generated ID;

determine that the generated ID is unique;

in response to determining that the generated ID is unique, provide the first version of the ID to the one of the plurality of components requesting the ID;

receive a request to obtain the second version of the ID, the request comprising an indication of the first version of the ID;

identify the second version of the ID based, at least partially, upon the indication of the first version of the ID; and provide the second version of the ID to the one of the plurality of components.

12. The computer storage medium of claim 11, wherein the request further comprises data specifying that the ID is to be encrypted using a hash algorithm and logic corresponding to the hash algorithm, and wherein encrypting the ID comprises generating a hash of the ID using the hash algorithm.

13. The computer storage medium of claim 11, wherein determining that the generated ID is unique comprises determining that the generated ID is unique within a specified region.

14. The computer storage medium of claim 11, wherein determining that the generated ID is unique comprises determining that the generated ID is globally unique.

15. The computer storage medium of claim 11, wherein the one of the plurality of components comprises one of a plurality of website components.

16. The computer storage medium of claim 11, having further computer executable instructions stored thereon that, when executed by the computer, cause the computer to generate, in response to determining that the generated ID is not unique, an error for indicating to the one of the plurality of components that the one or more rules resulted in generation of the ID that is not unique.

17. The computer storage medium of claim 11, having further computer executable instructions stored thereon that, when executed by the computer, cause the computer to authenticate the one of the plurality of components to determine that the one of the plurality of components is authorized to request the ID.

18. A system for generating an identifier ("ID"), the system comprising:

a data storage device for storing IDs and information associated with the stored IDs; and one or more computing devices configured to receive a request to generate an ID from one of a plurality of components, the request comprising one or more rules specifying a scheme used to generate the ID, type data indicating a type of the ID, encryption data specifying whether the ID is to be encrypted, and number data specifying that a number of IDs are to be generated, in response to receiving the request, utilize the rules to generate the number of IDs specified by the number data by generating at least a first version and a second version of the ID of the type specified by the request, associate the first version of the ID with the second version of the ID, store the second version of the ID at the data storage device with data associating the second version of the ID with the first version of the ID, determine that the encryption data specifies that the ID is to be encrypted;

in response to determining that the encryption data specifies that the ID is to be encrypted, encrypt the generated ID;

determine that the generated ID is unique, in response to determining that the generated ID is unique, provide the first version of the ID to the one of the plurality of components requesting the ID, receive a request to obtain the second version of the ID, the request comprising an indication of the first version of the ID, identify the second version of the ID based, at least partially, upon the indication of the first version of the ID, and provide the second version of the ID to the one of the plurality of components.

19. The system of claim 18, wherein the request further comprises data specifying that the ID is to be encrypted using a hash algorithm and logic corresponding to the hash algorithm, and wherein encrypting the ID comprises generating a hash of the ID using the hash algorithm.

20. The system of claim 18, wherein the one or more computing devices are further configured to:

in response to determining that the generated ID is not unique, generate an error for indicating to the one of the plurality of components that the one or more rules resulted in generation of the ID that is not unique.

21. The system of claim 18, wherein the plurality of components comprise a plurality of website components for a website in communication with the one or more computing devices.

22. The system of claim 18, wherein determining that the generated ID is unique comprises determining that the generated ID is unique within a specified region.

23. The system of claim 18, wherein determining that the generated ID is unique comprises determining that the generated ID is globally unique.

24. The system of claim 18, wherein the one or more computing devices are further configured to authenticate the one of the plurality of components to determine that the one of the plurality of components is authorized to request the ID.

* * * * *